May 2, 1967 R. T. CLEARY 3,317,682

SWITCHING DEVICE WITH SENSOR FOR PROXIMITY SWITCH

Filed Oct. 14, 1965

INVENTOR.
ROBERT T. CLEARY
BY C. A. Gulbrandsen
ATTY.

3,317,682

SWITCHING DEVICE WITH SENSOR FOR PROXIMITY SWITCH

Robert T. Cleary, Lockport, Ill., assignor to Automatic Electric Laboratories, Inc., Northlake, Ill., a corporation of Delaware Filed Oct. 14, 1965, Ser. No. 496,027
4 Claims. (Cl. 200—1)

The present invention relates to switching devices, and more particularly to a switching device that functions to actuate a capacitance type proximity switch when the user places his hand near the device, and further functions to mechanically control electrical circuitry when the user physically moves a portion of the device.

The complexities of electrical control circuitry frequently call for the conditioning of an electrical circuit or device, before its actual operation. This requirement necessitates the operation of two or more switches in proper sequence for correct operation. Neglect of the conditioning step or improper sequence of operation may cause difficulty. For example, it may be necessary to turn on a fan, or open a ventilating duct, before operating a heat producing device. Failure to perform the conditioning operation often results in damage to the device itself. Numerous other requirements for conditioning before operation can easily be envisioned.

Accordingly, it is the object of the present invention to provide a new and useful switching device which can be used to control a proximity switch, and to also control other electrical circuitry.

A feature of the present invention is the combination of a proximity switch sensing device and a manually operated switch in the same structure.

These and other features of the present invention will become more apparent by reference to the following specification and drawing in which.

Figure 1:
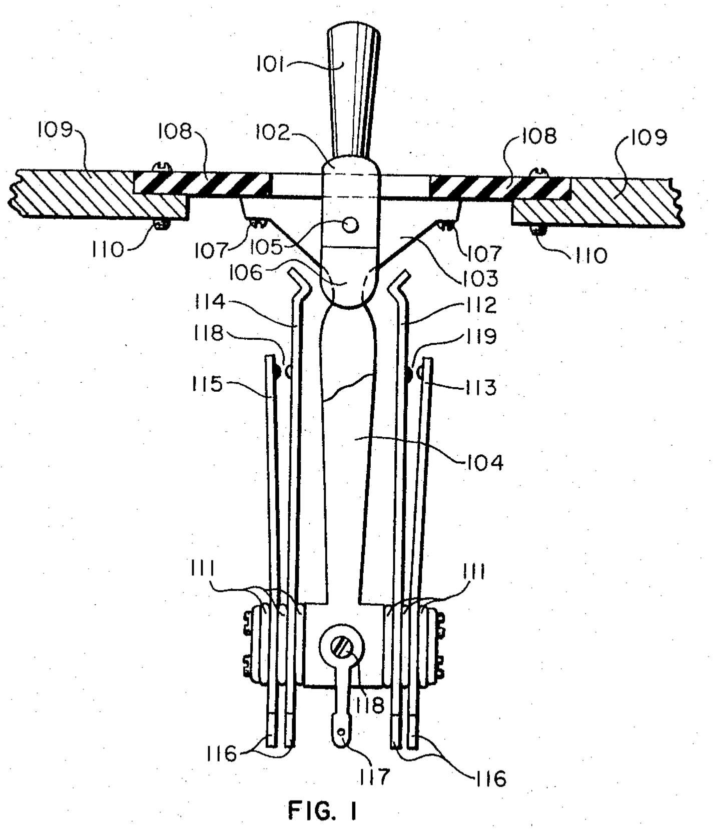
FIG. 1 is a partially sectioned sketch of a lever key embodying the principles of the present invention.

Referring now to FIG. 1, the lever key shown is similar in basic construction to that disclosed in U.S. Patent 3,156,789 issued to Vernon L. Van der Kooy on Nov. 10, 1964. The principal difference between the lever key of the present invention and that disclosed in the referenced patent is in the design and material of the handle and cam portions of the present key and the necessary mounting structure.

As shown in FIG. 1, the cam portion 102 and its associated handle 101 are constructed of material that can function as a conductor of electricity, preferably of metal. The handle 101 and the cam portion 102 may be of one piece. The lower portion of the cam 106 which will make contact with the actuating spring such as 112 and 114 is of an insulating material such as plastic. This portion is affixed to the metallic portion of the cam structure 102 in any convenient manner.

The cam is pivotally mounted to the lever key frame 103, the portion of 104 that is not shown. The frame portions 103 and 104 are held by fasteners such as screws 107 to a mounting plate 108 of insulating material that surrounds the cam 102 but permits motion about the pivot 105.

Pivot 105 is also of metal or other conductive material so that a conductive path exists from the handle 101 through the cam 102 and the pivot 105 to the frame 103. A terminal 117 is connected to the frame by means of a fastener such as screw 118 and it is at this terminal that a circuit connector may be affixed that extends to a proximity switch circuit.

In this manner the handle mechanism and associated structure of the lever key of FIG. 1 may be employed as a sensing plate for a proximity switch of well known type such as that disclosed in U.S. Patent 3,109,893 to R. V. Burns issued Nov. 5, 1963. Reference to this patent will disclose a sensing plate 321 shown in FIG. 3 for which the structure of the present invention could be substituted.

Operation of handle 101 and its associated cam 102 and insulated portion of the cam 106 about the pivot 105 will operate the switching portions of the device. When the handle is moved by the user to the right as viewed in FIG. 1, the insulating portion will engage operating spring 114 forcing it in the direction of spring 115 placing the contacts 118 in position against each other. It may be readily seen that a circuit extending over conductors connected at the terminals 116 associated with springs 114 and 115 is completed. Similarly when the key is operated to the left as viewed in FIG. 1, the insulating portion 106 of the cam will engage spring 112 forcing it towards spring 113 for engagement of contacts 119.

The particular combination of two "make-spring" combinations shown here is not to be construed as a limitation, rather any well known circuit contacting arrangement could be utilized in response to the manual operation of the key. Similarly other forms of switching mechanism such as rotary or slide switches could be employed and still be within the concept of the present invention.

Figure 2:
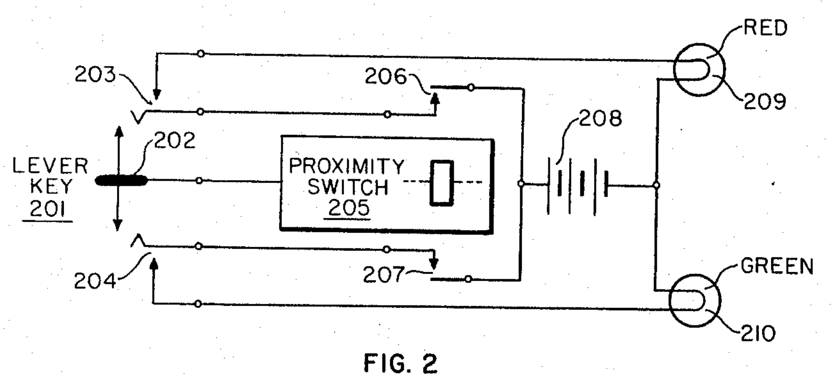
FIG. 2 is a schematic circuit diagram of a signalling device employing a switching device embodying the principles of the present invention.

A simple signalling circuit employing a switching device in accordance with the present invention is shown in FIG. 2. Assuming first that it is desirable to have power placed upon the signal lamps and only immediately prior to actuation. The user would first bring his hand near the operating mechanism 202 which corresponds to the handle 101 shown in FIG. 1 at which time the capacitive connection to ground through his body will operate proximity switch 205 in a manner similar to that described in the afore referenced Burns patent. Operation of the proximity switch 205 would operate a relay or similar device to close at contacts 206 and 207 battery 208 through to the lever key 201 at its armature or operating contacts 206 and 207. With battery thus applied, when the user places his hand near lever key 201, the switch mechanism may now be actuated in one direction to complete a circuit at contacts 203 to the red lamp 209 or by manual operation of the key in the opposite direction to complete a circuit path at contacts 204 to the green lamp 210. As long as the user maintains his hand on or near lever key 201 the selected lamp will remain lit. If for some reason the user removes his hand from the lever key 201, or the adjacent area, regardless of its position the previously selected lamp will be extinguished. In this manner a portable signalling device of the type described would not suffer the chance of excessive battery drain when inadvertently left in an on position.

Although the present invention has been described to a certain degree of particularity, it should be understood that the present disclosure has been made only by way of example and that numerous changes in the details and the combination of arrangement developments may be resorted to without departing from the scope and spirit of the present invention.

What is claimed is:

1. In combination, an electrical circuit, a proximity switch circuit and a switching device for operating said circuits, said switching device comprising:
   - sensing means connected to said proximity switch circuit, said proximity switch circuit operated in response to the placement of the hand of an operator in proximity to said sensing means to produce a first switching function;
   - at least one set of circuit switching contacts connected to said electrical circuit and located adjacent to and engageable by said sensing means;

said electrical circuit operated in response to the manual operation by an operator of said sensing means to engage said circuit switching contacts to produce a second switching function independent of said first switching function.

2. The combination as claimed in claim 1 wherein said sensing means is formed in part of conductive material, which part is connected to said proximity switch, and in part of non-conductive material, said non-conductive part being normally positioned adjacent to and operated in response to the manual operation of said sensing means to engage said switching contacts.

3. The combination as claimed in claim 2 wherein said switching devices includes:

a frame of electrically conductive material;

mounting means for said frame formed of electrically insulating material;

said switching contacts electrically insulated from said frame and mechanically connected to said frame; said conductive part of said sensing means mechanically and electrically connected to said frame; and said proximity switch circuit electrically connected to said frame.

4. The combination as claimed in claim 1 wherein said proximity switch is operative in response to the capacitive effect of the hand of an operator in proximity to said sensing means.

References Cited by the Examiner

UNITED STATES PATENTS

| | | | |
|---|---|---|---|
| 2,166,680 | 7/1939 | Creager | 200—1 |
| 2,411,576 | 11/1946 | Kelleigh | 200—1 X |
| 2,427,187 | 9/1947 | Bush | 200—1 X |
| 2,560,324 | 7/1951 | Babcock. | |
| 2,672,765 | 3/1954 | MacDonald | 200—1 X |
| 3,156,789 | 11/1964 | Van der Kooy | 200—1 |
| 3,161,733 | 12/1964 | Bowser et al. | 200—1 |
| 3,206,562 | 9/1965 | Griggs et al. | 300—6 |

ROBERT K. SCHAEFER, *Primary Examiner.*

J. R. SCOTT, *Assistant Examiner.*